United States Patent
Chen et al.

(10) Patent No.: US 12,198,540 B2
(45) Date of Patent: Jan. 14, 2025

(54) MESSAGE TRANSMISSION SYSTEM AND METHOD FOR ROADSIDE EQUIPMENT

(71) Applicant: INDUSTRIAL TECHNOLOGY RESEARCH INSTITUTE, Hsinchu (TW)

(72) Inventors: Shi-Xin Chen, Taoyuan (TW); Te-Hsuan Liu, Zhudong Township (TW); Wei-Hsin Hsu, Hsinchu (TW); Qin Wang, Taipei (TW); Chun-Che Chang, Yuanlin (TW); Jing-Shyang Hwu, Zhubei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 471 days.

(21) Appl. No.: 17/561,099

(22) Filed: Dec. 23, 2021

(65) Prior Publication Data
US 2023/0162596 A1     May 25, 2023

(30) Foreign Application Priority Data
Nov. 24, 2021   (TW) ................. 110143862

(51) Int. Cl.
G08G 1/01     (2006.01)
G01S 17/88     (2006.01)
G08G 1/081     (2006.01)

(52) U.S. Cl.
CPC ............ *G08G 1/0116* (2013.01); *G01S 17/88* (2013.01); *G08G 1/081* (2013.01)

(58) Field of Classification Search
CPC ..... B60W 30/18154; B60W 2050/146; B60W 2400/00; B60W 2510/18; B60W 2520/10;
(Continued)

(56) References Cited

U.S. PATENT DOCUMENTS 6,208,927 B1*   3/2001   Mine ............... B60W 30/18145
    701/72
6,321,158 B1*   11/2001   DeLorme ............. G06Q 10/047
    701/426
(Continued)

FOREIGN PATENT DOCUMENTS

CN     105280005 A     1/2016
CN     107067816 A     8/2017
(Continued)

OTHER PUBLICATIONS

Extended European Search Report for European Application No. 21215994.1, dated Jun. 17, 2022.
(Continued)

*Primary Examiner* — Redhwan K Mawari
(74) *Attorney, Agent, or Firm* — Birch, Stewart, Kolasch & Birch, LLP

(57) ABSTRACT

A message transmission method for a roadside equipment includes the following steps. A plurality of external sensor information is received. A road intersection sign phase information and a road map information are inputted. An object position analysis, a speed analysis, and an sign analysis in object moving direction are performed based on the external sensor information, the road intersection sign phase information, and the road map information, and a classification of dangerous objects in different groups is outputted. According to a current transmission bandwidth limitation and the classification of the dangerous objects, a dangerous object message with a higher classification of the dangerous objects is preferentially selected and transmitted within available transmission bandwidth.

12 Claims, 8 Drawing Sheets

(58) Field of Classification Search
CPC ......... B60W 2552/00; B60W 2555/60; B60W 2556/50; B60W 40/04

See application file for complete search history.

(56) References Cited

U.S. PATENT DOCUMENTS

| | | | | |
|---|---|---|---|---|
| 7,237,203 | B1* | 6/2007 | Kuenzner | B60K 35/00 715/764 |
| 8,083,015 | B2* | 12/2011 | Kobayashi | B60W 40/076 180/65.21 |
| 8,384,532 | B2* | 2/2013 | Szczerba | G01S 13/867 345/7 |
| 9,207,091 | B2* | 12/2015 | Ota | G08G 1/09623 |
| 9,896,106 | B1* | 2/2018 | Wrobel | B60W 50/14 |
| 11,006,264 | B1 | 5/2021 | Takia | |
| 11,315,429 | B1* | 4/2022 | Balmaceda | G08G 1/0967 |
| 2004/0193347 | A1* | 9/2004 | Harumoto | G08G 1/166 701/45 |
| 2006/0290202 | A1* | 12/2006 | Shibata | B60T 7/22 303/165 |
| 2007/0129012 | A1* | 6/2007 | Snow | H04M 1/72463 455/26.1 |
| 2010/0201505 | A1* | 8/2010 | Honary | G06Q 30/04 707/769 |
| 2010/0256848 | A1* | 10/2010 | Sasaki | B60W 20/00 701/22 |
| 2011/0187520 | A1* | 8/2011 | Filev | B60W 50/16 340/438 |
| 2013/0279491 | A1* | 10/2013 | Rubin | G08G 1/162 370/347 |
| 2014/0232518 | A1* | 8/2014 | Stoehr | G07B 15/04 340/5.6 |
| 2020/0174475 | A1* | 6/2020 | Min | B60W 30/18154 |
| 2021/0046941 | A1* | 2/2021 | Visintainer | G08G 1/163 |
| 2021/0067970 | A1 | 3/2021 | Huang | |
| 2021/0144667 | A1 | 5/2021 | Lepp et al. | |
| 2021/0183244 | A1* | 6/2021 | Malhan | G08G 1/09 |
| 2022/0153273 | A1* | 5/2022 | Metli | B60W 30/18154 |
| 2022/0348227 | A1* | 11/2022 | Foster | G06V 20/588 |
| 2022/0383750 | A1* | 12/2022 | Sharma Banjade | G08G 1/005 |

FOREIGN PATENT DOCUMENTS

| | | | | |
|---|---|---|---|---|
| CN | 110816544 | A | * 2/2020 | ............ B60W 40/09 |
| CN | 112669607 | A | 4/2021 | |
| JP | 2002329291 | A | * 11/2002 | |
| JP | 2015207177 | A | * 11/2015 | |
| TW | 201349190 | A | 12/2013 | |
| TW | 201814889 | A | 4/2018 | |
| WO | WO 2021/081689 | A1 | 5/2021 | |

OTHER PUBLICATIONS

Banani et al., "Selecting Basic Safety Messages to Verify in VANETs using Zone Priority", APCC 2014, pp. 423-428.

Joseph et al., "An Adaptive Power Level Control Algorithm for DSRC Congestion Control", DIVANet'18, Oct. 28-Nov. 2, 2018, Montreal, QC, Canada, pp. 57-62.

Kim et al., "Novel Backoff Mechanism for Mitigation of Congestion in DSRC Broadcast", arXiv:2005.08921v4 [cs.NI] Sep. 11, 2020, pp. 1-14.

Kim et al., "Prioritization of Basic Safety Message in DSRC Based on Distance to Danger", arXiv:2003.09724v2 [cs.NI], May 19, 2020, pp. 1-10.

Meddeb et al., "Priority based Safety Management and Slot Reservation for Authenticated Vehicle", IEEE 2019, pp. 1977-1982.

Woo et al., "Performance Analysis for Priority-Based Broadcast in Vehicular Networks", International Journal of Distributed Sensor Networks, 2013, vol. 2013, Article ID 734637, pp. 1-9.

* cited by examiner

MESSAGE TRANSMISSION SYSTEM AND METHOD FOR ROADSIDE EQUIPMENT This application claims the benefit of Taiwan application Serial No. 110143862, filed Nov. 24, 2021, the disclosure of which is incorporated by reference herein in its entirety.

BACKGROUND

Technical Field

The disclosure relates in general to a roadside equipment, and more particularly to a message transmission system and a method thereof for a roadside equipment.

Description of the Related Art

The current broadcast operation method of a road side unit (RSU) is limited by bandwidth. If there are too many object messages, the distance between the object and the intersection can only be used as a basis for selection of messages. In addition, if all object messages are sent by broadcast, RSU cannot accurately provide dangerous object messages, because some object messages (such as vehicles stopped on the roadside, vehicles far away from intersection) are not related to those objects with on-board unit (OBU), and it will result in a waste of resources of wireless transmission bandwidth.

SUMMARY

The disclosure is directed to a message transmission system and a method thereof for a roadside equipment, which can send out dangerous object messages based on a degree of danger of the object within the available transmission bandwidth, so as to reduce the transmission volume of vehicle-to-road communication.

According to one embodiment, a message transmission method for roadside equipment is provided and includes the following steps: receiving information from a plurality of external sensors, entering a road intersection sign phase information and a road map information, performing an object position analysis, a speed analysis, and a sign analysis in object moving direction based on the external sensor information, the road intersection sign phase information, and the road map information, and outputting a classification of dangerous objects in different groups. According to a current transmission bandwidth limitation and the classification of the dangerous objects, a dangerous object message with a higher classification of the dangerous objects is preferentially selected and transmitted within an available transmission bandwidth.

According to another embodiment, a message transmission system for a roadside equipment is provided, which includes a dynamic detection device for object at intersection, a sign receiving device, a dangerous object classification module, and a vehicle-to-road communication device. The dynamic detection device for object at intersection is used to receive information from a plurality of external sensors. The sign receiving device is used for inputting a road intersection sign phase information and a road map information. The dangerous object classification module performs an object position analysis, a speed analysis, and a sign analysis in object moving direction based on the external sensor information, the sign phase information of the road intersection, and the road map information, and outputs a classification of dangerous objects in different groups based on the external sensor information, the sign phase information of the road intersection, and the road map information. The vehicle-to-road communication device preferentially selects and transmits a dangerous object message with a higher classification of the dangerous objects within an available transmission bandwidth according to a current transmission bandwidth limitation and the classification of the dangerous objects.

The above and other aspects of the disclosure will become better understood with regard to the following detailed description of the embodiment(s). The following description is made with reference to the accompanying drawings.

Figure 1A:
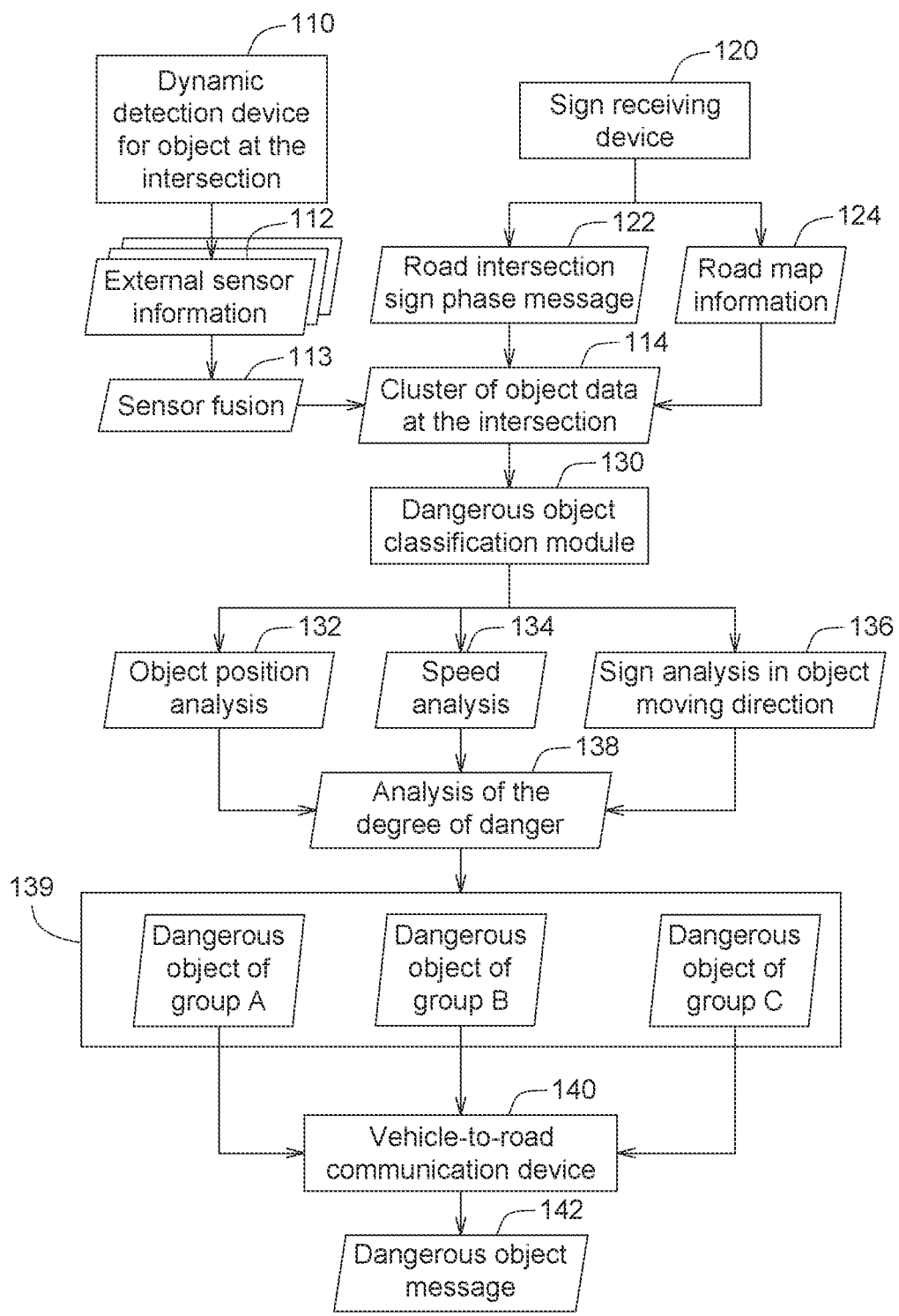
FIG. 1A is a schematic diagram showing the operation of components of a message transmission system for a roadside equipment according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical solutions for the embodiments of the present application are clearly and thoroughly disclosed with accompanying drawings. Obviously, the embodiments disclosed below are only some rather than all of the embodiments of the present disclosure. All embodiments obtained by anyone ordinarily skilled in the art of the present application according to the disclosed embodiments of the present disclosure are within the scope of protection of the present disclosure if the obtained embodiments are obvious. The same or similar elements will be represented by the same or similar reference signs.

Figure 1B:
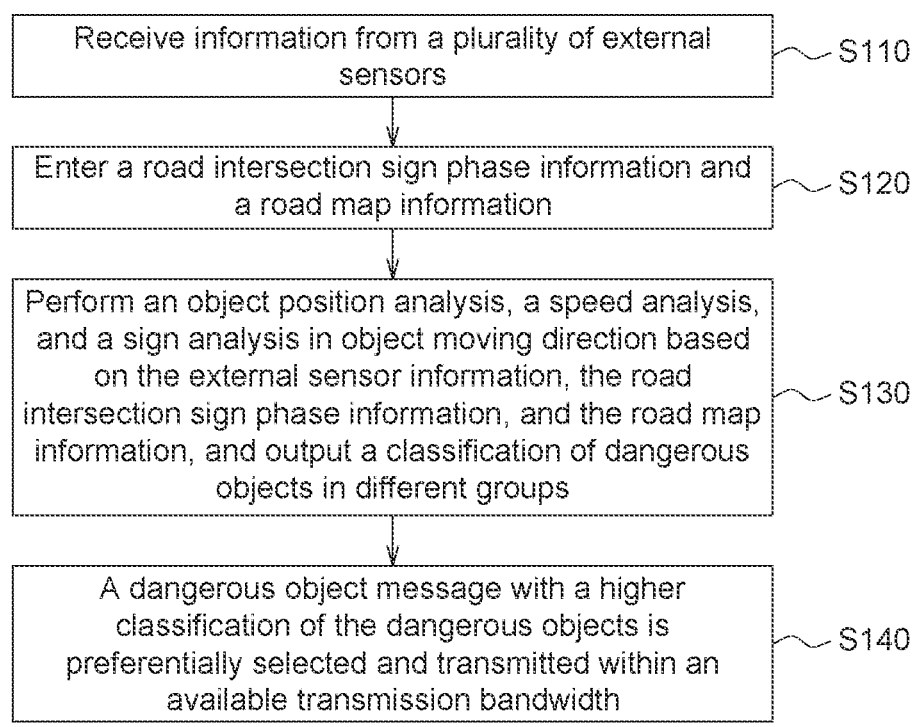
FIG. 1B is a schematic diagram of a method of transmitting message for a roadside equipment according to an embodiment of the present disclosure.

Please refer to FIGS. 1A and 1B. FIG. 1A is a schematic diagram of the operation of components of a message transmission system 100 for a roadside equipment according to an embodiment of the present disclosure, and FIG. 1B is a schematic diagram of a message transmission method for a roadside equipment according to an embodiment of the present disclosure.

In this embodiment, the message transmission system 100 for a roadside equipment includes a dynamic detection device 110 for object at the intersection, a sign receiving device 120, a dangerous object classification module 130, and a vehicle-to-road communication device 140. The dynamic detection device 110 at the intersection is installed on a side of the road to detect cars, motorcycles, bicycles, or pedestrians (hereinafter referred to as the object 101) passing through the intersection. The dynamic detection device 110 at the intersection can include LiDAR modules, laser ranging modules, camera modules, image recognition modules, and computing modules, etc., which can calculate the position, the speed, and the object moving direction of each detected object passing through the intersection in real time, the relative distance between the detected object and the intersection, and the relative distance between the object and the object.

In this embodiment, the dynamic detection device 110 at the intersection can cooperate one or more LiDAR modules, laser ranging modules or camera modules to obtain the external sensor information 112 corresponding to the object at the intersection, and obtain different types of external sensor information 112 through sensor fusion 113, which are aggregated into a cluster of object data 114 at the intersection for the machine to determine. The fused external sensor information 112 includes the position, the speed, the acceleration, the object moving direction and relative distance of the objects, etc. In addition, the fused external sensor information 112 can also include the type of objects (for example, truck, passenger car, bus, motorcycle), the state of the object (stationary, moving, straight moving, turning, decelerating, accelerating, etc.), determine whether the relative distance between the object and the intersection is greater than or less than a preset threshold, and whether the relative distance between the object and the object is greater than or less than a preset threshold, etc.

Figure 2:
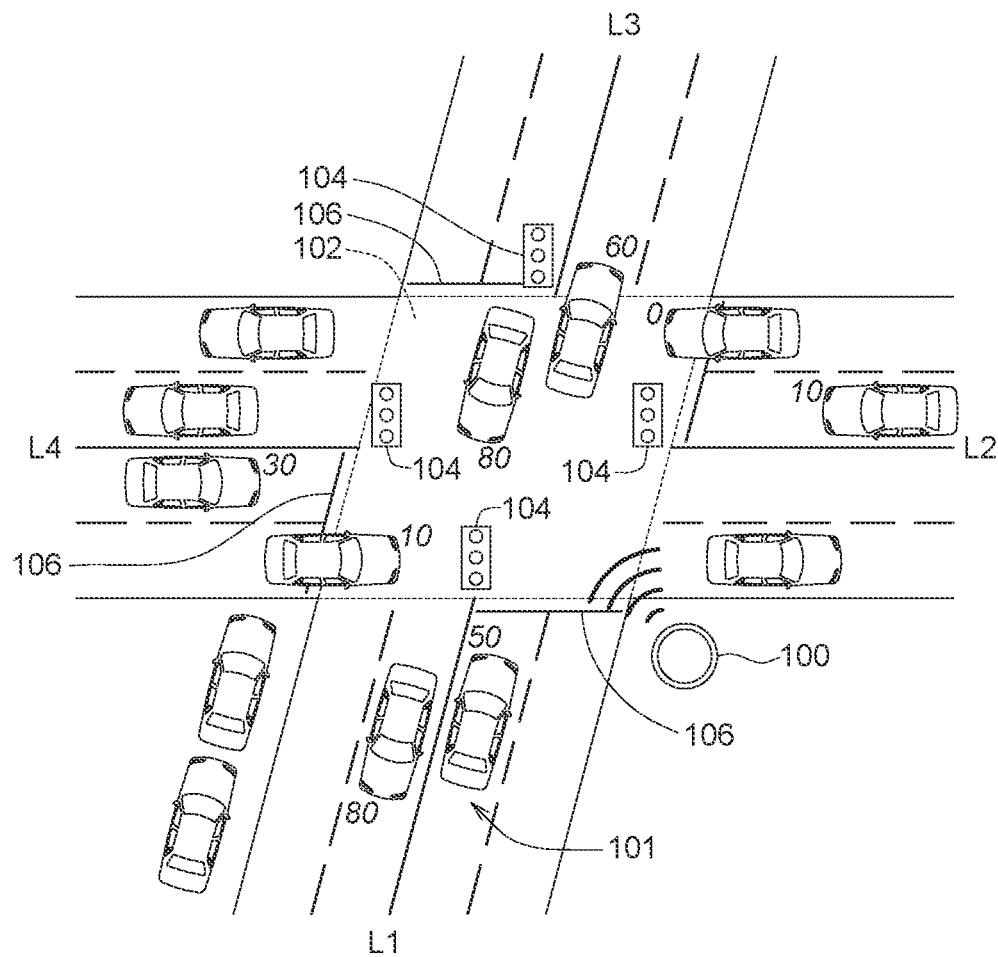
FIG. 2 is a schematic diagram of an object at an intersection and its position, speed, and moving direction according to an embodiment of the present disclosure.

Please refer to FIG. 2. Generally, the intersection 102 of a road can be an area surrounded by three or four road sections L1-L4, that is, the middle rectangular area defined by three or four road sections L1-L4 is the intersection 102, but the road sections are not limited to four, and it may be more than four sections. Each of the road sections L1-L4 is provided with a traffic sign 104 (traffic light or pass/turn indicator) to control the vehicles passing through the intersection 102, the pass direction of vehicles, and the pass time of vehicles. In addition, each intersection 102 has a traffic signal controller (not shown in the figure). Through the network communication of the traffic signal controller, the traffic signal of each road section L1-L4 can be controlled in series, and the signs of each road section will not conflict to ensure the safety of vehicles passing through the intersection 102.

In this embodiment, the signal receiving device 120 may be connected to or wirelessly communicate with the traffic signal controller (not shown in the figure) of the intersection 102 to receive a sign phase information 122 at the intersection and a road map information 124. The sign phase information 122 includes signals, for example, red, yellow, green, left-turn green, right-turn green, and other signals. Road map information 124 includes, for example, the location of the intersection (e.g. the GPS coordinates of the center of the intersection), the type of intersection, the intersection area, the location of the sign, the position of the crossing lines, and the position of the stop line 106 of each road section, etc.

In this embodiment, the dynamic detection device 110 and the sign receiving device 120 can simultaneously input the external sensor information 112, the road map information 124, and the intersection sign phase information 122 corresponding to the intersection 102 for the message transmission system 100 to determine the objects near the intersection 102 in real time, the road map information 124, and the intersection sign phase information 122 etc., as shown in FIG. 2.

Please refer to FIG. 2. FIG. 2 is a schematic diagram of objects 101 at the intersection and their positions, speeds, and object moving directions according to an embodiment of the present disclosure. Each road section L1-L4 has two lanes in both directions, namely the lane leading to intersection 102 and the lane leaving intersection 102. There are a total of eight lanes. Each lane has a plurality of objects 101 (that is, vehicles) driving on the road, each of the positions of the vehicles is detected, and the head of the vehicles is object moving direction. The italicized numbers next to the vehicles indicate the speed of each object. The speed will be adjusted dynamically according to the state of the vehicle. The speed of some vehicles that have left the intersection 102 is not displayed. The following is only an example showing the speed of vehicles approaching the intersection 102 as a basis for classification. In this embodiment, the dangerous object classification module 130 can analyze the position, the speed, the object moving direction, and the signs in object moving direction of each detected object passing through the intersection 102 to output the classification of dangerous objects of different groups.

Please refer to FIGS. 1A, 1B, and 2. FIG. 1B is a schematic diagram of a message transmission method for a roadside equipment according to an embodiment of the present disclosure. The message transmission method includes the following steps S110 to S140. In step S110, a plurality of external sensor information 112 is received. In step S120, an intersection sign phase information 122 and a road map information 124 are entered. In step S130, an object position analysis 132, a speed analysis 134, and a sign analysis 136 in object moving direction are performed based on the external sensor information 112, the intersection sign phase message 122, and the road map information 124, and the classification of dangerous objects of different groups 139 is outputted. In step S140, a dangerous object message 142 with a higher dangerous object classification is preferentially selected and transmitted within an available transmission bandwidth. In such way, the present disclosure can send a dangerous object message 142 based on the degree of danger of the objects within the available transmission bandwidth, so as to reduce the transmission volume of vehicle-to-road communication.

Figure 3A:
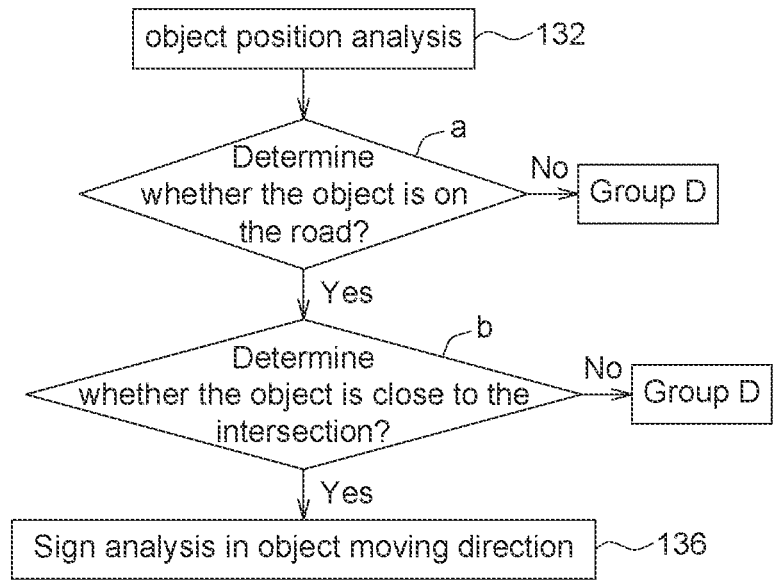
FIG. 3A is a schematic diagram of the position analysis of object at the intersection according to an embodiment of the present disclosure.
Figure 3B:
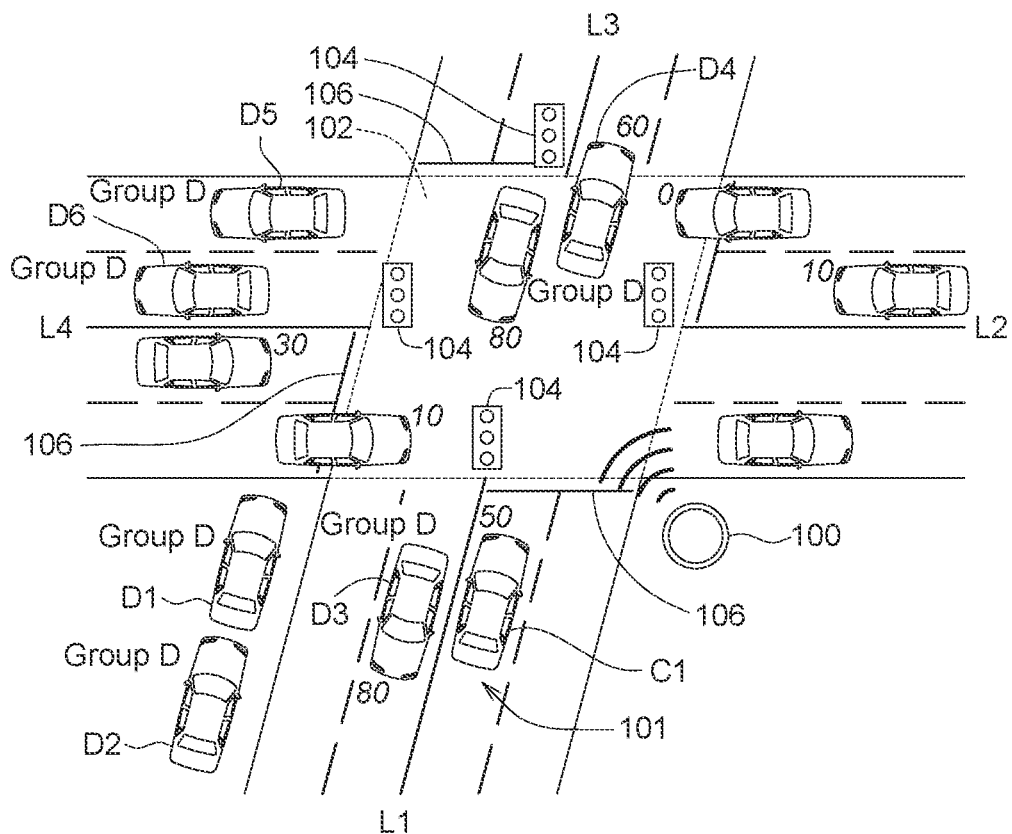
FIG. 3B is a schematic diagram of objects at the intersection and the classification of dangerous objects in group D after the position analysis of FIG. 3A.
Figure 3C:
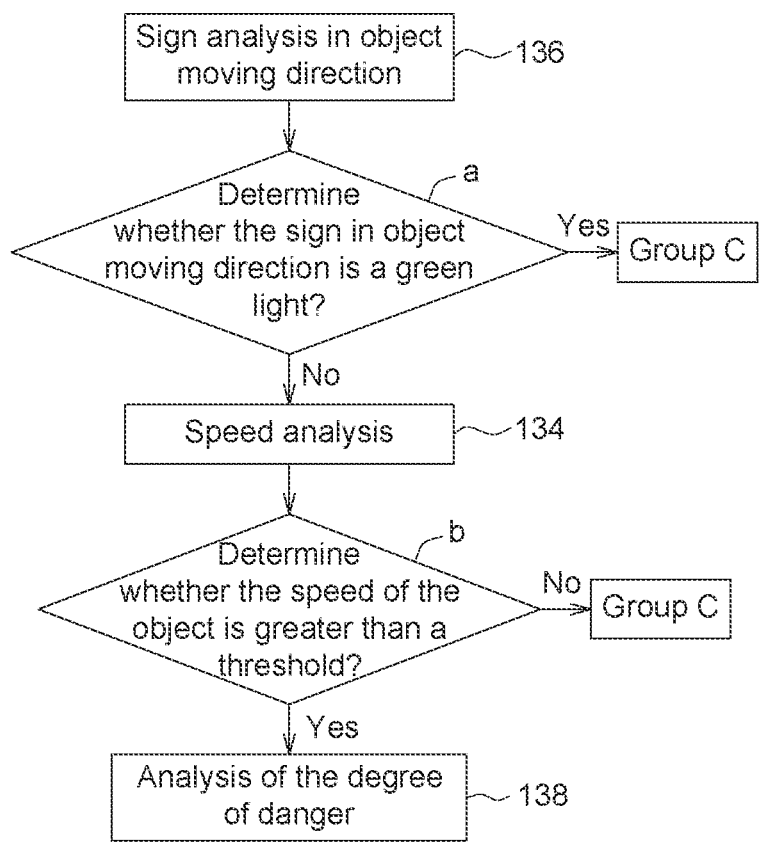
FIG. 3C is a schematic diagram of the sign analysis in object moving direction and speed analysis of the objects at the intersection according to an embodiment of the present disclosure.
Figure 3D:
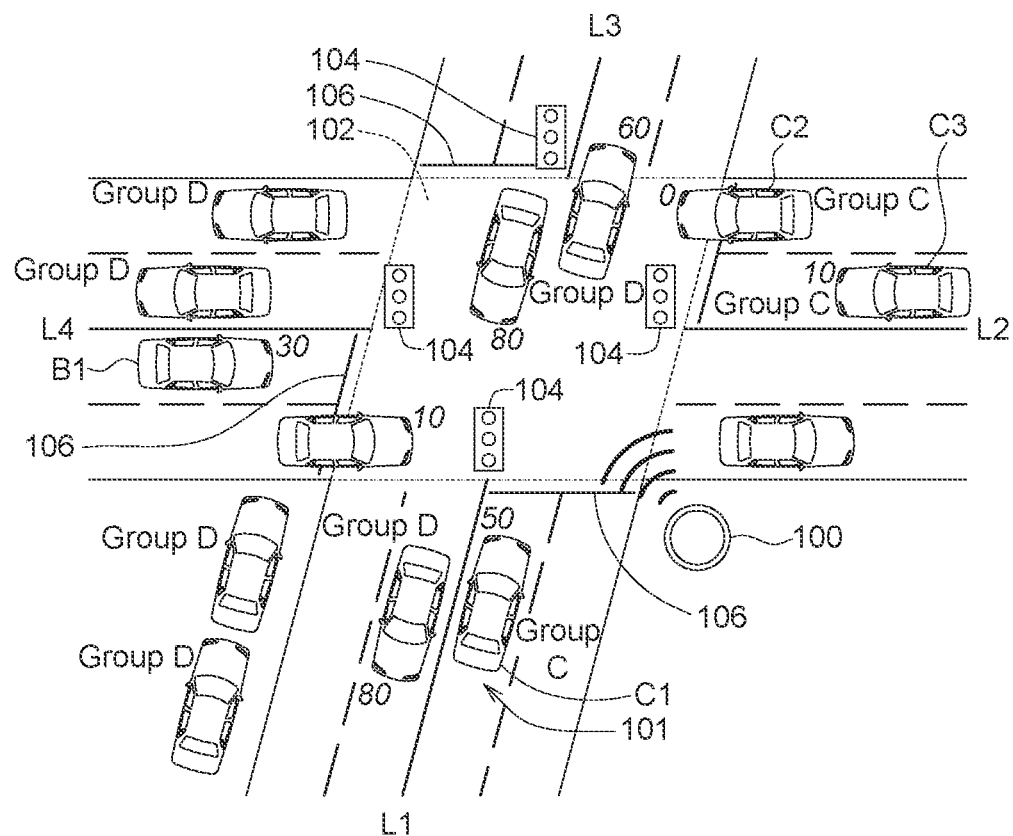
FIG. 3D is a schematic diagram of the classification of dangerous objects at the intersection in groups C and D after the sign analysis and speed analysis of FIG. 3C.
Figure 3E:
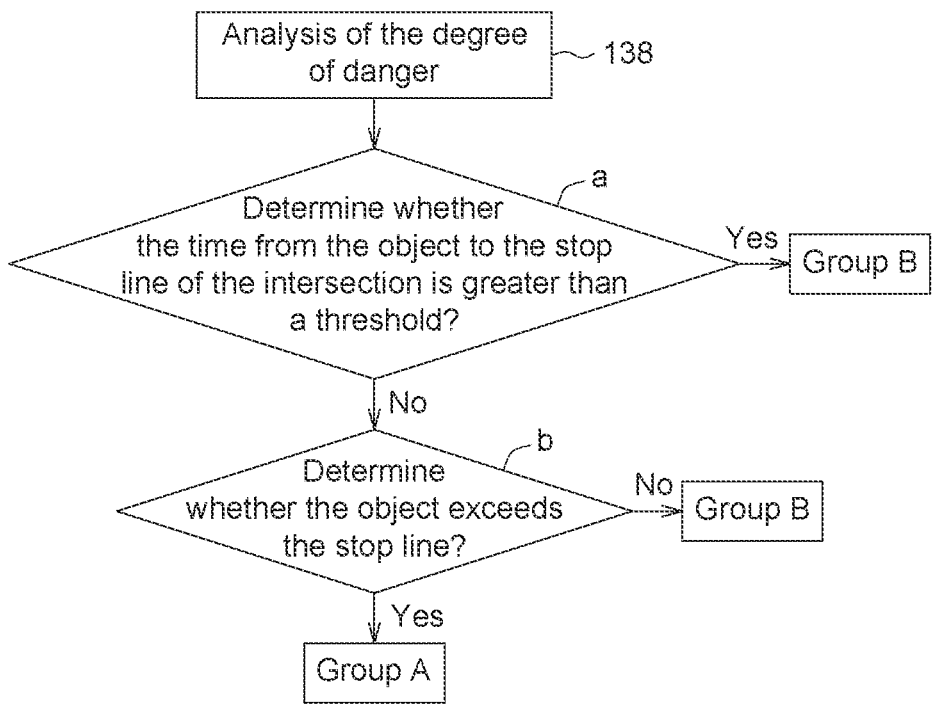
FIG. 3E is a schematic diagram of the analysis of the degree of danger of the objects at the intersection according to an embodiment of the present disclosure.
Figure 3F:
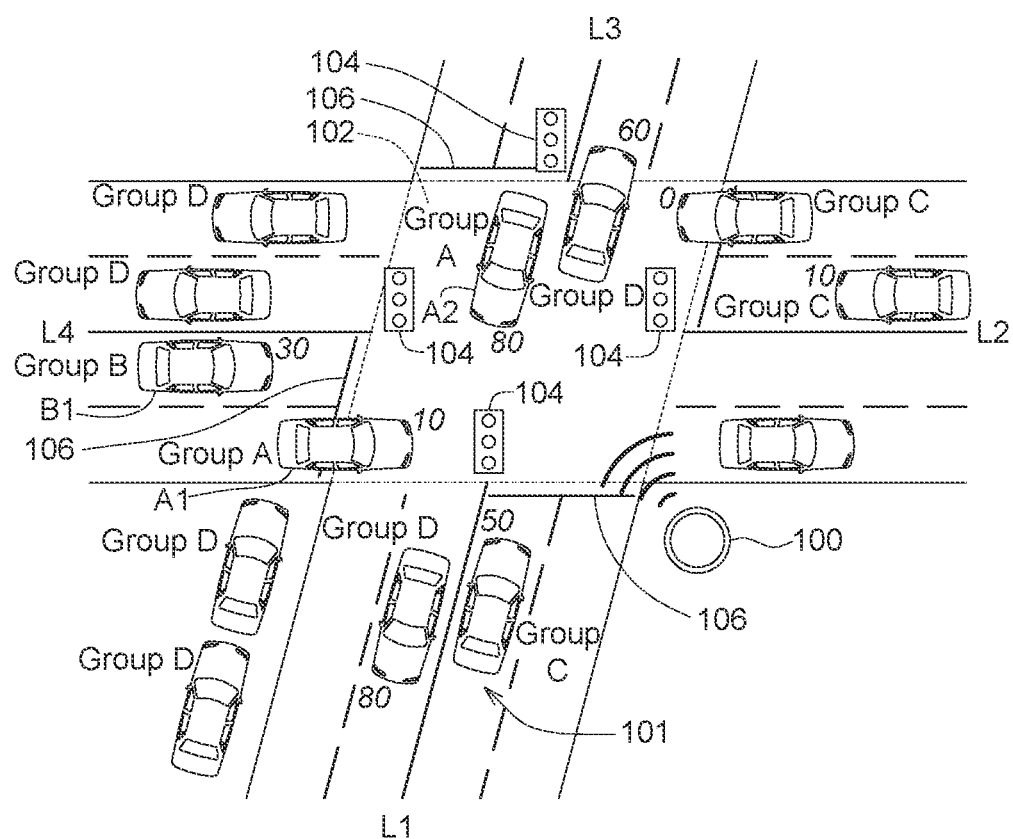
FIG. 3F is a schematic diagram of the classification of dangerous objects at the intersection in groups A, B, C, and D after the analysis of the degree of danger of FIG. 3E.

A specific example of the classification of dangerous objects 139 has been shown in FIGS. 3A to 3F. FIG. 3A is a schematic diagram of the object position analysis 132 at the intersection according to an embodiment of the present disclosure; FIG. 3B is a schematic diagram of objects at the intersection and the classification of dangerous objects in group D after the position analysis 132 of FIG. 3A; FIG. 3C is a schematic diagram of the sign analysis 136 in object moving direction and speed analysis 134 of the objects at the intersection according to an embodiment of the present disclosure; FIG. 3D is a schematic diagram of the classification of dangerous objects at the intersection in groups C and D after the sign analysis 136 and speed analysis 134 of FIG. 3C; FIG. 3E is a schematic diagram of the analysis 138 of the degree of danger of the objects at the intersection according to an embodiment of the present disclosure; FIG. 3F is a schematic diagram of the classification of dangerous objects at the intersection in groups A, B, C, and D after the analysis 138 of the degree of danger of FIG. 3E.

First, in FIGS. 3A and 3B, the object position analysis 132 includes (a) determining whether the object 101 is on the road, and if so, continues (b) determining whether the object 101 is close to the intersection. If it is determined that the object 101 is not on the road, for example, the vehicles D1 and D2 parked on the side of the road are not dangerous to other driving vehicles, so this type of object 101 is classified into a dangerous object of group D. In addition, if it is determined that the object 101 is far away from the intersection, for example, vehicles D3 to D6, it means that the vehicle has passed the intersection or far enough away from the intersection, and is not dangerous for other driving vehicles, so this type of object 101 is classified into a dangerous object of group D. In addition, if it is determined that the object 101 is on the road and is close to the intersection 102, for example, the vehicle C1, the sign analysis 136 in the object moving direction and the speed analysis 134 are performed to determine whether this type of object 101 is classified into a dangerous object of group C. It is understandable that the danger degree of the dangerous object of group C is higher than that of the dangerous object of group D.

Further, in FIGS. 3C and 3D, the sign analysis 136 and speed analysis 134 of the object at the intersection include (a) determining whether the sign in object moving direction is a green light, if not, continue (b) determining whether the speed of the object is greater than a threshold. When the sign in object moving direction is a green light, the object 101 can be classified into a dangerous object of group C; when the sign in object moving direction is not green light and the speed of the object is less than the threshold, the object 101 can be classified into a dangerous object of group C; when the sign in object moving direction is not green light and the speed of the object is greater than the threshold, continue to perform the analysis 138 of degree of danger of the object to determine whether the object 101 is classified into a dangerous object of group B.

For example, in FIG. 3D, when the north-south lane is green light and the east-west lane is red light, the vehicles on the north-south lane are classified into dangerous objects of group C except for the classification of dangerous objects of group D. Then, when the speed of the vehicle in the east-west lane is less than the threshold (for example, 10 km/hr), for example, vehicles C2 and C3, it is not dangerous for the vehicles in the north-south lane, so this type of object 101 is classified into a dangerous object of group C. When the speed of the vehicle in the east-west lane is greater than a threshold, for example, vehicle B1, it may be dangerous to the vehicle in the north-south lane. An analysis 138 of the degree of danger of the object is performed to determine whether this type of object 101 is classified into a dangerous object of group B. It is understandable that the danger degree of the dangerous object of group B is higher than that of the dangerous object of group C.

Further, in addition to the above-mentioned object position analysis 132, speed analysis 134, and sign analysis 136 in object moving direction, the system 100 can perform an analysis 138 of the degree of danger based on the external sensor information 112, intersection sign phase information 122, and road map information 124. In FIGS. 3E and 3F, the analysis 138 of the degree of danger of the object at the intersection includes (a) determining whether the time from the object 101 to the intersection stop line 106 is greater than a threshold, if not, continues (b) determining whether the object 101 exceeds the stop line 106. When the time from the object 101 to the stop line 106 of the intersection is greater than the threshold, the object 101 can be classified into a dangerous object of group B; when the time from the object 101 to the stop line 106 of the intersection is less than the threshold and the object 101 does not exceed the stop line 106, the object 101 can be classified into a dangerous object of group B; when the time from the object 101 to the stop line 106 of the intersection is less than the threshold and the object 101 exceeds the stop line 106, the object 101 can be classified into a dangerous object of group A.

For example, in FIG. 3F, when the east-west lane is red light, and the time from a vehicle on the east-west lane to the stop line 106 of the intersection is greater than a threshold, for example, the vehicle B1, it indicates that the vehicle is away from the stop line 106 about a certain distance, and it is still possible to stop without exceeding the stop line and is not dangerous for vehicles on the north-south lane. Therefore, this type of object 101 can be classified into a dangerous object of group B. When a vehicle in the east-west lane exceeds the stop line 106, for example, the vehicle A1, it may collide with a vehicle in the north-south lane (e.g., the vehicle A2) at a next time, and this type of object 101 can be classified into a dangerous objects of group A. In this embodiment, when an object 101 with a high degree of danger (e.g., the vehicle A1) appears in the moving direction of the vehicle A2, the classification of the dangerous object of the vehicle A2 is increased to group A so as to have priority to send the dangerous object message 142 to the vehicles A1 and A2. It is understandable that the danger degree of the dangerous object of group A is higher than that of the dangerous object of group B, and the danger degree of the dangerous object of group B is higher than that of the dangerous object of group C.

In this embodiment, the vehicle-to-road communication device 140 preferentially selects and transmits a dangerous object message 142 with a higher dangerous object classification. In other words, the message of the dangerous object classification of group A is first transmitted, and then the message of the dangerous object classification of group B is transmitted, and then the messages of the dangerous object classification of group C and group D is finally transmitted. According to the limitation of the current transmission bandwidth and the classification of the degree of danger from high to low, the vehicle-to-road communication device 140 sends a message to notify the object 101 at the intersection to ensure that the system 100 can instantly send a dangerous object message 142 within the available transmission bandwidth, reduce a chance of collision of objects 101 at the intersection and reduce the transmission volume of vehicle-to-road communication.

The system 100 can scan the message of the surrounding vehicles at the intersection through radar and send the message through the roadside equipment with the function of dedicated short range communication (DSRC). The object messages at the intersection can be stored in the basic safety message (SAE J2735 BSM) and is broadcast regularly through exclusive short-range wireless communication. When the on-board unit (OBU) of auto-driving car receives this message and parses it, the safety collision avoidance system judges the message with its own information by algorithm to determine whether a collision will occur to make an action to stop the vehicle automatically.

For example, the internet of vehicles (V2X) technology is used on a road to improve the safety of auto-driving cars, and the primary task is how to make vehicles have safety protection during driving and reduce the incidence of traffic accidents. The disclosure can be used in the vehicle-to-vehicle transmission, vehicle-to-road transmission and intersection sign transmission to strengthen driving safety, avoid collisions at intersection, and give priority to warn the drivers whose vehicles are about to collide (for example, vehicles A1 and A2) to pay attention to driving safety. Therefore, when a vehicle equipped with on-board unit (OBU) approaches the roadside equipment and is about to pass through the intersection 102, the OBU can receive the road map information 124, sign phase information 122 at the intersection and the classification 139 of dangerous objects of the other vehicles from the system 100, but it is not limited, the driver can see whether there is a dangerous object message 142 (such as a sound or a picture) according to the in-vehicle user interface to help the driver brake early or reduce the speed of the car. In addition, the disclosure can also be used in a left-turn anti-collision system to notify the driver of the dangerous object message 142 as soon as possible to prevent the driver's vision from being blocked by the oncoming vehicle waiting to turn left when the vehicle is turning left and causing a danger of collision with a straight-moving vehicle.

Especially for objects without BSM capabilities (such as pedestrians, motorcycles, or cars without OBU), the basic safety message (BSM) packets can are sent to other vehicles through the broadcast mechanism of this system 100, and the dangerous object messages 142 can be sent based on the limitation of the current transmission bandwidth and the degree of danger from high to low to reduce a chance of object collisions and reduce the transmission volume of vehicle-to-road communication to meet market demand.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A message transmission method for a roadside equipment, comprising:
   receiving information from a plurality of external sensors;
   receiving a road intersection sign phase information and a road map information;
   performing an object position analysis, a speed analysis, and a sign analysis in object moving direction based on the external sensor information, the road intersection sign phase information, and the road map information;
   outputting a classification of dangerous objects in different groups according to the object position analysis, the speed analysis, and the sign analysis in object moving direction; and
   according to a current transmission bandwidth limitation and the classification of the dangerous objects, a dangerous object message with a higher classification of the dangerous objects is preferentially selected and transmitted within an available transmission bandwidth,
   wherein the classification of dangerous objects in different groups comprises determining following steps: (1) when the object is on the road and the object is far away from the intersection, the object is classified into a dangerous object of group D; (2) when the sign in the object moving direction is not a green light and the speed of the object is less than the threshold, the object is classified into a dangerous object of group C; (3) when the time from the object to a stop line is less than a threshold and the object does not exceed the stop line, the object is classified into a dangerous object of group B; (4) when the time from the object to the stop line is less than the threshold and the object exceeds the stop line, the object is classified into a dangerous object of group A, wherein a danger degree of group A is higher than a danger degree of group B, the danger degree of group B is higher than a danger degree of group C, and the danger degree of group C is higher than a danger degree of group D.

2. The method according to claim 1, wherein the external sensor information comprises radar information, LiDAR information, or camera information at the intersection.

3. The method according to claim 1, wherein after receiving the external sensor information, the method further includes performing sensor fusion on the external sensor information.

4. The method according to claim 1, wherein the object position analysis comprises:
   determine whether an object is on the road; and
   determine whether the object is close to the intersection,
   when the object is not on the road, the object is classified into the dangerous object of group D;
   when the object is on the road and the object is far away from the intersection, the object is classified into the dangerous object of group D;
   when the object is on the road and the object is close to the intersection, the sign analysis in object moving direction and the speed analysis are performed.

5. The method according to claim 4, wherein the sign analysis in the object moving direction and the speed analysis comprise:
   determining whether the sign in object moving direction of the object is a green light; and
   determining whether the speed of the object is greater than the threshold,
   when the sign in the object moving direction is a green light, the object is classified into the dangerous object of group C;
   when the sign in the object moving direction is not the green light and the speed of the object is less than the threshold, the object is classified into the dangerous object of group C;
   when the sign in the object moving direction is not the green light and the speed of the object is greater than the threshold, an analysis of degree of danger is performed.

6. The method according to claim 5, wherein the analysis of degree of danger comprises:
   determining whether the time from the object to the stop line of the intersection is greater than the threshold; and
   determining whether the object exceeds the stop line,
   when the time from the object to the stop line is greater than the threshold, the object is classified into the dangerous object of group B;
   when the time from the object to the stop line is less than the threshold and the object does not exceed the stop line, the object is classified into the dangerous object of group B;

when the time from the object to the stop line is less than the threshold and the object exceeds the stop line, the object is classified into the dangerous object of group A.

7. A message transmission system for a roadside equipment, comprising:
a dynamic detection device for objects at intersection used to receive information from a plurality of external sensors;
a signal receiving device for receiving a sign phase information and a road map information;
a dangerous object grading module for performing an object position analysis, a speed analysis, and a sign analysis in object moving direction based on the external sensor information, the road intersection sign phase information, and the road map information and outputting a classification of dangerous objects in different groups according to the object position analysis, the speed analysis, and the sign analysis in object moving direction, wherein the classification of dangerous objects in different groups comprises determining following steps: (1) when the object is on a road and the object is far away from the intersection, the object is classified into a dangerous object of group D; (2) when a sign in the object moving direction is not a green light and a speed of the object is less than a threshold, the object is classified into a dangerous object of group C; (3) when a time from the object to a stop line is less than a threshold and the object does not exceed the stop line, the object is classified into a dangerous object of group B; (4) when the time from the object to the stop line is less than the threshold and the object exceeds the stop line, the object is classified into a dangerous object of group A, wherein a danger degree of group A is higher than a danger degree of group B, the danger degree of group B is higher than a danger degree of group C, and the danger degree of group C is higher than a danger degree of group D;
a vehicle-to-road communication device for preferentially selecting and transmitting a dangerous object message with a higher classification of the dangerous objects within an available transmission bandwidth according to a current transmission bandwidth limitation and the classification of the dangerous objects.

8. The system according to claim 7, wherein the external sensor information comprises radar information, LiDAR information, or camera information at the intersection.

9. The system according to claim 7, wherein after the dynamic detection device receives the external sensor information, the system further includes performing sensor fusion on the external sensor information.

10. The system according to claim 7, wherein the object position analysis comprises:
determining whether the object is on the road; and
determining whether the object is close to the intersection,
when the object is not on the road, the object is classified into the dangerous object of group D;
when the object is on the road and the object is far away from the intersection, the object is classified into the dangerous object of group D;
when the object is on the road and the object is close to the intersection, the sign analysis in object moving direction and the speed analysis are performed.

11. The system according to claim 10, wherein the sign analysis in the object moving direction and the speed analysis comprise:
determining whether the sign in object moving direction of the object is a green light; and
determining whether the speed of the object is greater than the threshold,
when the sign in the object moving direction is a green light, the object is classified into the dangerous object of group C;
when the sign in the object moving direction is not a green light and the speed of the object is less than the threshold, the object is classified into the dangerous object of group C;
when the sign in the object moving direction is not the green light and the speed of the object is greater than the threshold, an analysis of degree of danger is performed.

12. The system according to claim 11, wherein the analysis of degree of danger comprises:
determining whether the time from the object to the stop line of the intersection is greater than the threshold; and
determining whether the object exceeds the stop line,
when the time from the object to the stop line is greater than the threshold, the object is classified into the dangerous object of group B;
when the time from the object to the stop line is less than the threshold and the object does not exceed the stop line, the object is classified into the dangerous object of group B;
when the time from the object to the stop line is less than the threshold and the object exceeds the stop line, the object is classified into the dangerous object of group A.

* * * * *